(12) United States Patent
Suzuki

(10) Patent No.: US 8,840,324 B2
(45) Date of Patent: Sep. 23, 2014

(54) BLADE DRIVE DEVICE AND OPTICAL INSTRUMENT

(71) Applicant: Seiko Precision Inc., Narashino (JP)

(72) Inventor: Mitsuru Suzuki, Narashino (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 14/023,747

(22) Filed: Sep. 11, 2013

(65) Prior Publication Data

US 2014/0010527 A1    Jan. 9, 2014

Related U.S. Application Data

(63) Continuation of application No. PCT/JP2012/052366, filed on Feb. 2, 2012.

(30) Foreign Application Priority Data

Jun. 10, 2011   (JP) .................................. 2011-130548

(51) Int. Cl.
*G03B 9/08*      (2006.01)
*G03B 9/10*      (2006.01)
*G03B 9/36*      (2006.01)

(52) U.S. Cl.
CPC .. *G03B 9/10* (2013.01); *G03B 9/08* (2013.01); *G03B 9/36* (2013.01)
USPC ........................................................ 396/469

(58) Field of Classification Search
CPC ......... G03B 9/10; H02N 2/0055; H02N 2/006
USPC ................................................. 396/463, 469
See application file for complete search history.

(56) References Cited

U.S. PATENT DOCUMENTS

| 5,298,916 | A | 3/1994 | Sato |
| 6,796,728 | B2 * | 9/2004 | Miyazaki ...................... 396/463 |
| 2003/0012573 | A1 * | 1/2003 | Sekizawa et al. ............. 396/463 |

(Continued)

FOREIGN PATENT DOCUMENTS

| JP | H4-108242 | 9/1992 |
| JP | H9-65639 | 3/1997 |

(Continued)

OTHER PUBLICATIONS

International Search Report for International Application No. PCT/JP2012/052366 dated May 1, 2012.

(Continued)

*Primary Examiner* — Clayton E Laballe
*Assistant Examiner* — Linda B Smith
(74) *Attorney, Agent, or Firm* — Kratz, Quintos & Hanson, LLP

(57) ABSTRACT

A blade drive device includes: a board including an opening; a blade movable between a position receding from the opening and a position covering at least a portion of the opening; a first actuator including a first rotor rotatable about a first axis and a first stator, and being capable of driving the blade; a second actuator including a second rotor rotatable about a second axis and a second stator, and being capable of driving the blade; first and second positioning portions respectively positioning the first and second actuators; and a first biasing member respectively biasing the first and second actuators toward the first and second positioning portions.

11 Claims, 4 Drawing Sheets

(56) References Cited

U.S. PATENT DOCUMENTS

| | | | |
|---|---|---|---|
| 2004/0036798 A1* | 2/2004 | Saito et al. | 348/363 |
| 2005/0286889 A1* | 12/2005 | Kihara | 396/463 |
| 2009/0245780 A1* | 10/2009 | Chiang et al. | 396/469 |
| 2011/0135480 A1* | 6/2011 | Drmic | 416/198 R |

FOREIGN PATENT DOCUMENTS

| | | |
|---|---|---|
| JP | 2006-158140 A1 | 6/2006 |
| JP | 2007-155773 A1 | 6/2007 |
| JP | 2010-256473 A1 | 11/2010 |

OTHER PUBLICATIONS

Notification of Reasons for Refusal dispatched Jan. 14, 2014 by the Japanese Patent Office in counterpart application No. 2011-130548 with English translation. All prior art documents cited in this communication have already been made of record in the IDS filed on Sep. 11, 2013.

* cited by examiner

BLADE DRIVE DEVICE AND OPTICAL INSTRUMENT

CROSS-REFERENCE TO RELATED APPLICATION

This application is a continuation of and claims priority to International Patent Application No. PCT/JP2012/052366 filed on Feb. 2, 2012, which claims priority to Japanese Patent Application No. 2011-130548 filed on Jun. 10, 2011, subject matter of these patent documents is incorporated by reference herein in its entirety.

BACKGROUND (i) Technical Field

The present invention relates to blade drive devices and optical instruments.

(ii) Related Art

There is a blade drive device equipped with: a board including an opening; a blade opening and closing the opening, and an actuator driving the blade. The actuator is positioned by positioning portions which are integrally or separately provided in the board. It can be considered that a biasing member is provided for biasing the actuator toward the positioning portions in order to stabilize operating characteristics of the blade. Japanese Unexamined Patent Application Publication No. 2010-256473 discloses a blade drive device equipped with a biasing member for biasing a stator of an actuator.

There is the blade drive device equipped with plural actuators. In such a case, when biasing members are respectively provided for plural actuators, the blade drive device might be increased in size.

SUMMARY

It is thus object of the present invention to provide a blade drive device suppressing an increase in the size thereof, suppressing a variation in operating characteristics of a blade, and including a plurality of actuators, and an optical instrument having the same.

According to an aspect of the present invention, there is provided a blade drive device including: a board including an opening; a blade movable between a position receding from the opening and a position covering at least a portion of the opening; a first actuator including a first rotor rotatable about a first axis and a first stator, and being capable of driving the blade; a second actuator including a second rotor rotatable about a second axis and a second stator, and being capable of driving the blade; first and second positioning portions respectively positioning the first and second actuators; and a first biasing member respectively biasing the first and second actuators toward the first and second positioning portions.

DETAILED DESCRIPTION

Figure 1:
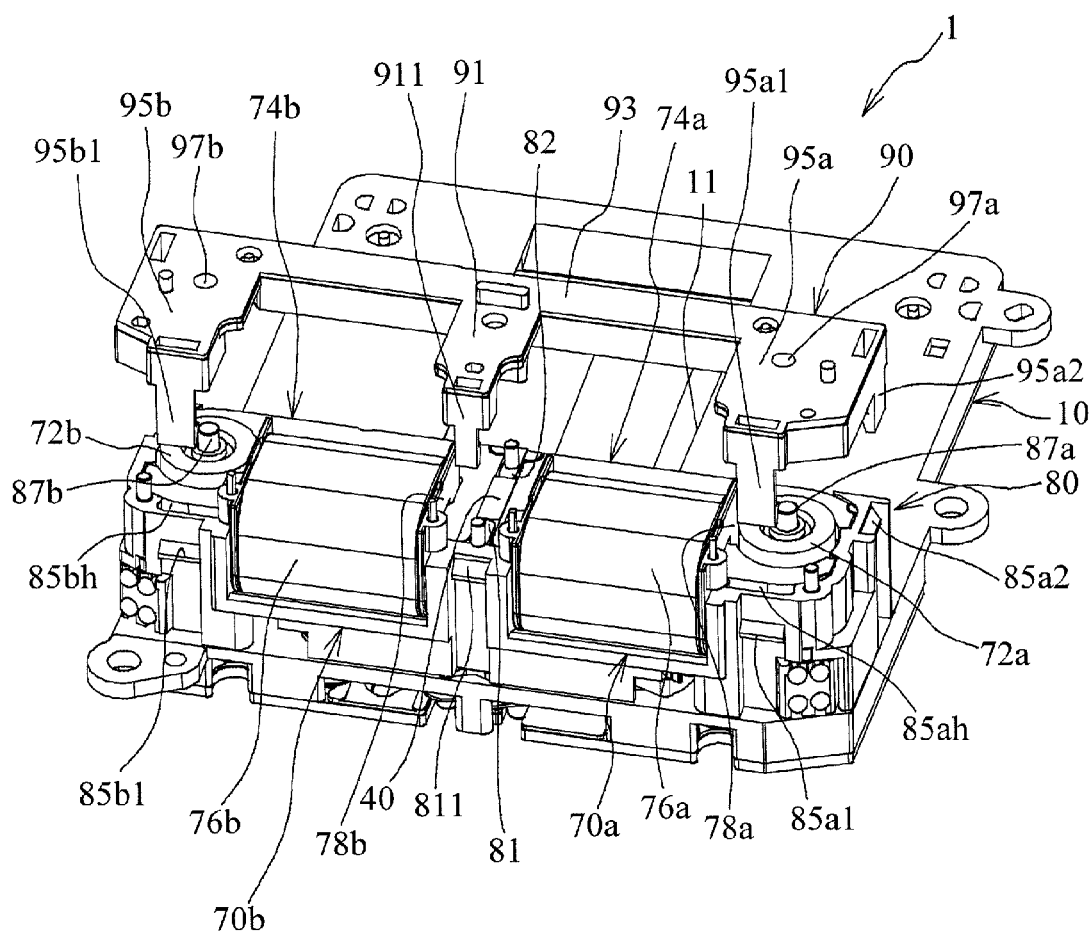
FIG. 1 is a perspective view of a blade drive device according to the present embodiment.
Figure 2:
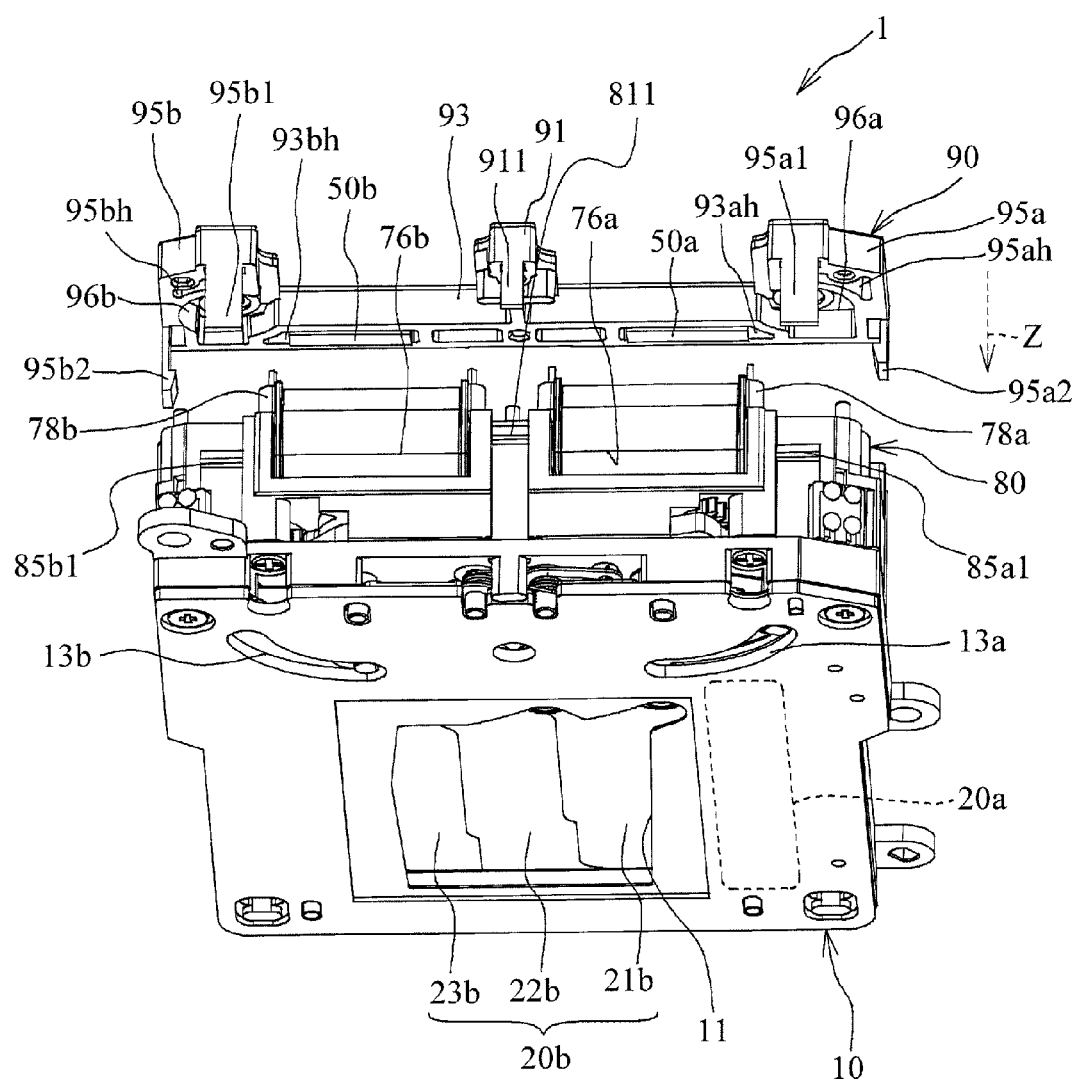
FIG. 2 is a perspective view of the blade drive device according to the present embodiment.

FIGS. 1 and 2 are perspective views of a blade drive device 1 according to the present embodiment. The blade drive device 1 is also referred to as a focal plane shutter. The blade drive device 1 is employed in an optical instrument such as a digital camera, a still camera, or a video camera. The blade drive device 1 includes a board 10, a leading blade 20a, a trailing blade 20b, actuators 70a and 70b, a holder 80, and a cover 90. The leading blade 20a is an example of first blades. The trailing blade 20b is an example of second blades. The board 10 includes the opening 11. The leading blade 20a and the trailing blade 20b open and close this opening 11. The actuators 70a and 70b respectively drive the leading blade 20a and the trailing blade 20b. The actuators 70a and 70b are an example of first and second actuators, respectively. The holder 80 supports the actuators 70a and 70b and is secured to the board 10. The holder 80 is an example of a support member. The cover 90 is secured to the holder 80 so as to cover at least a portion of the actuators 70a and 70b supported by the holder 80.

The leading blade 20a and the trailing blade 20b each include plural blades. Specifically, the plural blades included in the leading blade 20a are connected to two arms that are rotatably supported by the board 10 in the parallel-linkage manner. The trailing blade 20b has the same arrangement. The leading blade 20a recedes from the opening 11 in a state where plural blades overlap one another, and covers the opening 11 in a state where blades expand. The trailing blade 20b has the same arrangement. FIGS. 1 and 2 illustrate a state where the plural blades included in the leading blade 20a overlap one another and recedes from the opening 11 and the plural blades 21b, 22b, and 23b included in the trailing blade 20b expand and cover the opening 11.

The actuator 70a includes: a rotor 72a rotatably supported by the holder 80; a stator 74a excited to generate magnetic force between the stator 74a and the rotor 72a, and a coil 76a for exciting the stator 74a. The rotor 72a is a permanent magnet that is energized to have different polarities in the circumferential direction. The rotation of the rotor 72a is transmitted to the leading blade 20a through a member, not illustrated. The rotation of the rotor 72a drives the leading blade 20a. The actuator 70b has the same arrangement. The rotation of the rotor 72b drives the trailing blade 20b. Additionally, FIG. 2 illustrates escape slots 13a and 13b formed in the board 10. The escape slot 13a is provided for permitting the movement of a drive pin transmitting the rotation of the rotor 72a to the leading blade 20a. The escape slot 13b has the same arrangement.

The holder 80 supporting the actuators 70a and 70b is secured to the board 10. The holder 80 is provided with engaging claws 811, 85a1, 85a2, 85b1, and 85b2 (Not illustrated in FIGS. 1 and 2, but shown in FIG. 3). The cover 90 is provided with plural engaging claws 911, 95a1, 95a2, 95b1, and 95b2. These claws engage with each other, so the holder 80 and the cover 90 are secured to each other. The holder 80 and the cover 90 are made of a synthetic resin. FIGS. 1 and 2 illustrate a state before the holder 80 is assembled with the cover 90. Additionally, after the holder 80 is assembled with the cover 90, the cover 90 is secured with a flexible printed circuit board that is electrically connected with the coils 76a and 76b.

Figure 3:
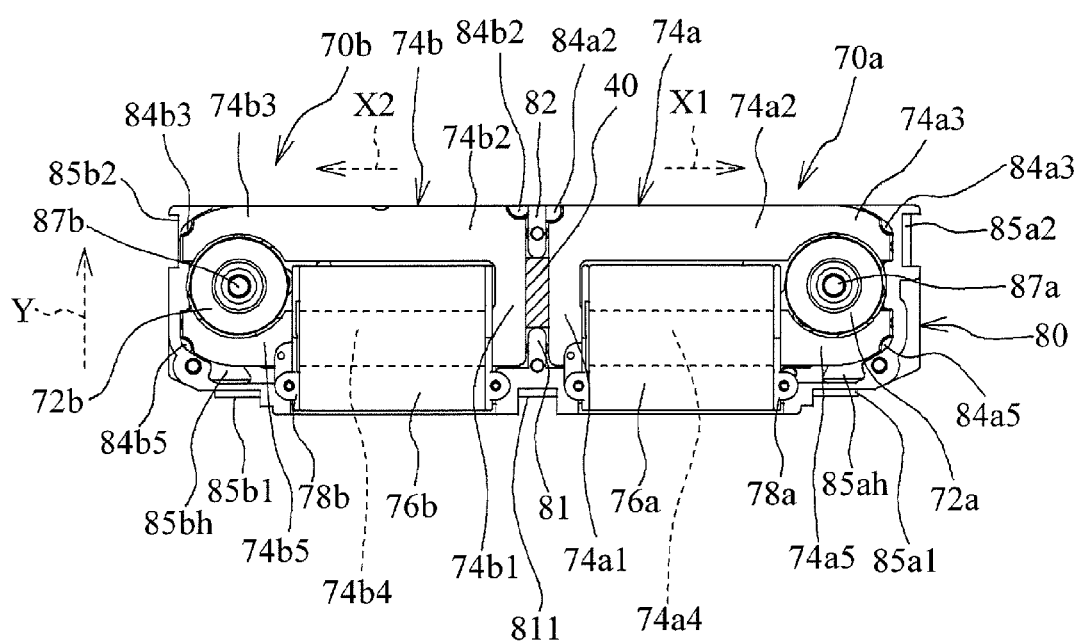
FIG. 3 is an explanatory view of a holder.

FIG. 3 is an explanatory view of the holder 80. FIG. 3 is the view when viewed from the front side of the holder 80. The holder 80 is formed with spindles 87a and 87b rotatably supporting the rotors 72a and 72b, respectively. The spindles 87a and 87b extend in the direction perpendicular to a plane parallel to the board 10. The spindles 87a and 87b are parallel to each other. The spindles 87a and 87b are an example of first and second axes.

The stators 74a and 74b are arranged on the holder 80. The stator 74a includes: a base portion 74a1 extending in a predetermined direction; leg portions 74a2 and 74a4 respectively extending from both ends of the base portion 74a1 in the direction perpendicular to the base portion 74a1; a magnetic pole portion 74a3 formed at an end of the leg portion 74a2, and a magnetic pole portion 74a5 formed at an end of the leg portion 74a4. The leg portion 74a4 is assembled with a coil bobbin 78a around which the coil 76a is wound. The magnetic pole portions 74a3 and 74a5 face the rotor 72a. The energization of the coil 76a excites the magnetic pole portions 74a3 and 74a5 to respectively generate different polarities. This generates the magnetic force between the magnetic pole portions 74a3 and 74a5 and the rotor 72a, so the rotor 72a rotates. Likewise, the stator 74b includes a base portion 74b1, leg portions 74b2 and 74b4, and magnetic pole portions 74b3 and 74b5. The energization of the coil 76b rotates the rotor 72b.

The actuators 70a and 70b are arranged on the holder 80 in such a manner that the base portion 74a1 of the stator 74a faces the base portion 74b1 of the stator 74b. Specifically, the stators 74a and 74b are arranged in the direction perpendicular to the spindles 87a and 87b. The holder 80 is provided with partition walls 81 and 82 separating the base portion 74a1 of the stator 74a from the base portion 74b1 of the stator 74b. The partition walls 81 and 82 prevent the stators 74a and 74b from being brought into contact with each other.

The holder 80 is formed with positioning portions 84a3 and 84a5 which are respectively abuttable with the magnetic pole portions 74a3 and 74a5 of the stator 74a. Further, the holder 80 is formed with a positioning portion 84a2 abuttable with the base portion 74a1. The positioning portions 84a2, 84a3, and 84a5 each have a semicircular column shape. When the holder 80 is viewed from the front side as illustrated in FIG. 3, these positioning portions 84a2, 84a3, and 84a5 protrude toward the stator 74a. Portions of the stator 74a with which these positioning portions are abuttable are recessed in such a manner to correspond to the shapes thereof. The actuator 70a is positioned at a predetermined position by these positioning portions 84a2, 84a3, and 84a5. Likewise, the holder 80 is provided with positioning portions 84b2, 84b3, and 84b5 with which the base portion 74b1 and the magnetic pole portions 74b3 and 74b5 are respectively abuttable. Portions of the stator 74b with which these positioning portions are abuttable are recessed to correspond to the shapes thereof. The actuator 70b is positioned at a predetermined position by these positioning portions 84b2, 84b3, and 84b5.

A biasing member 40 is arranged between the stators 74a and 74b. Specifically, the biasing member 40 is arranged between the base portion 74a1 of the stator 74a and the base portion 74b1 of the stator 74b. The biasing member 40 is an example of a first biasing member. In FIG. 3, the biasing member 40 is illustrated by hatched lines. The space for accommodating the biasing member 40 is defined between the partition walls 81 and 82. The biasing member 40 is arranged in this space. The biasing member 40 is a rubber, but it may be a foamed member such as a sponge.

In the state illustrated in FIG. 3, the biasing member 40 biases the stator 74a in the direction X1 and the stator 74b in the direction X2. Herein, the directions X1 and X2 are the plane direction parallel to the board 10. The directions X1 and X2 are opposite to each other. Thus, the biasing member 40 biases the stator 74a toward the positioning portions 84a3 and 84a5, and biases the stator 74b toward the positioning portions 84b3 and 84b5. In other words, the biasing member 40 biases the actuator 70a toward the positioning portions 84a3 and 84a5 and the actuator 70b toward the positioning portions 84b3 and 84b5. Also, the biasing member 40 biases the stators 74a and 74b in the direction perpendicular to the spindles 87a and 87b. The positioning portions 84a3 and 84a5 are an example of a first positioning portion. The positioning portions 84b3 and 84b5 are an example of a second positioning portion.

As for an order of assembling the stator 74a to the holder 80, after the stators 74a and 74b are assembled to the holder 80, the biasing member 40 is inserted between the stators 74a and 74b. Therefore, the stators 74a and 74b are biased by the biasing member 40. Herein, there are clearances between the stator 74a and the positioning portions 84a2, 84a3, and 84a5 in order to facilitate assembling the stator 74a to the holder 80. If there is no clearance, it might be difficult to assemble the stator 74a to the holder 80 because of abutment of the stator 74a with the positioning portion 84a2 or the like. Further, dust might be generated by shaving the positioning portion 84a2 or the like.

However, after the stator 74a is assembled to the holder 80, these clearances cause a variation in operating characteristics of the blade driven by the actuator 70a. As mentioned above, in the actuator 70a, the energization of the coil 76a excites the magnetic pole portions 74a3 and 74a5 to respectively generate different polarities. This generates the magnetic force between the magnetic pole portions 74a3 and 74a5 and the rotor 72a, which rotates the rotor 72a. Herein, since there are the clearances between the stator 74a and the positioning portions 84a2, 84a3, and 84a5, this might generate a variation in the positional relationship between the magnetic pole portions 74a3 and 74a5 and the rotor 72a. The relative positional displacement of the stator 74a to the rotor 72a might cause a variation in characteristics of the magnetic force exerted between the rotor 72a and the stator 74a. This might cause a variation in rotational characteristics of the rotor 72a. Specifically, this might cause a variation in operating characteristics such as response speed or torque characteristics of the actuator 70a. Further, this might cause a variation in operating characteristics such as response speed or operating speed of the leading blade 20a driven by the actuator 70a. This might be applicable to the stator 74b. This might cause the variations in operating characteristics of the leading blade 20a and the trailing blade 20b. In the blade drive device 1 according to the present embodiment, the biasing member 40 biases the stators 74a and 74b toward the positioning portions 84a3 and 84a5 and the positioning portions 84b3 and 84b5 in the opposite directions, respectively. It is thus possible to suppress the relative positional displacement of the stator 74a and 74b with respect to the rotors 72a and 72b, respectively, while the above mentioned clearances are ensured. The positional displacement of the stators 74a and 74b is suppressed, thereby suppress the variation in operating characteristics of the actuators 70a and 70b of the blade drive device 1. This suppresses the variation in operating characteristics of the leading blade 20a and the trailing blade 20b respectively driven by the actuators 70a and 70b. Also, the single biasing member 40 biases two stators 74a and 74b, thereby suppressing the space where the biasing member occupies in the holder 80. This suppresses an increase in the size of the holder 80 and an increase in the size of the blade drive device 1. Further, the single biasing member 40 biases two stators 74a and 74b, thereby reducing the number of the parts.

The biasing member 40 is arranged between the partition walls 81 and 82 separating the stators 74a and 74b from each other. Therefore, the biasing member 40 is arranged in such a manner to effectively use the space in the holder 80, thereby suppressing an increase in the size thereof.

As mentioned above, the biasing member 40 biases the stator 74a only in the direction X1. However, as illustrated in FIG. 3, the positioning portions 84a3 and 84a5 each have a column shape, and the portions of the stator 74a with which these positioning portions 84a3 and 84a5 are abuttable are recessed in such a manner to correspond to the shapes thereof. Therefore, the stator 74a is biased in the direction X1, so the positioning portions 84a3 and 84a5 also define the position of the stator 74a in the direction Y perpendicular to the direction X1. Likewise, the stator 74b is positionally defined in the directions X2 and Y. Therefore, the stators 74a and 74b are positionally defined in the plane direction by the biasing member 40 and the positioning portions 84a3, 84a5, 84b3, and 84b5.

Figure 4:
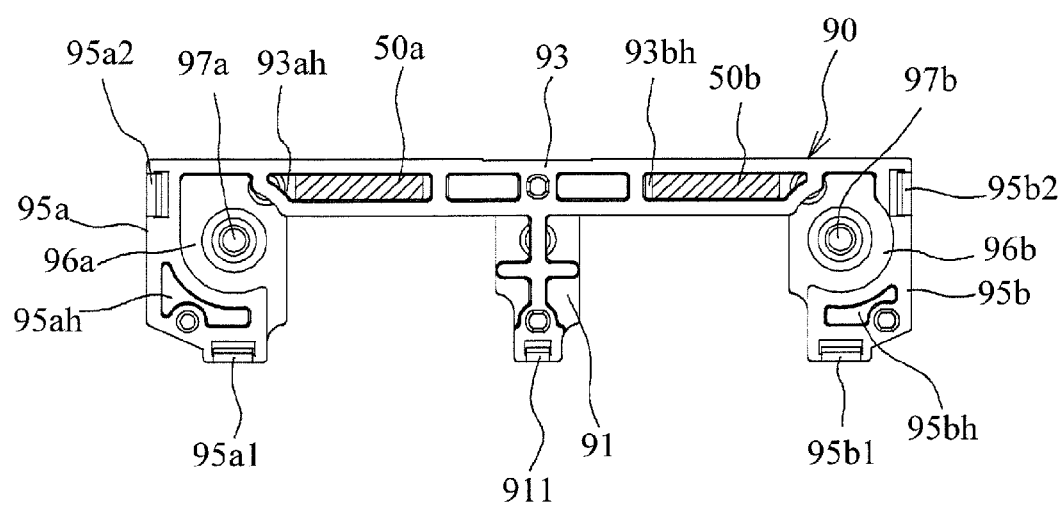
FIG. 4 is an explanatory view of a cover.

FIG. 4 is an explanatory view of the cover 90. FIG. 4 illustrates the cover 90 facing the holder 80 when viewed from the holder 80 side in a state where the holder 80 is assembled with the cover 90. As illustrated in FIG. 4, the cover 90 includes: a base portion 91 extending in a predetermined direction; an extending portion 93 extending in the direction intersecting the base portion 91; and rotor cover portions 95a and 95b respectively formed at both ends of the extending portion 93. The extending portion 93 extends in such a direction as to move the leading blade 20a and the trailing blade 20b. The base portion 91 is positioned at the substantial center of the extending portion 93 and extends in the direction perpendicular thereto. The rotor cover portions 95a and 95b are formed with fitting holes 97a and 97b into which the spindles 87a and 87b are fitted, respectively. The rotor cover portions 95a and 95b respectively cover the rotors 72a and 72b. The base portion 91, the extending portion 93, and the rotor cover portions 95a and 95b are provided with holes into which plural pins provided in the holder 80 are fitted. When the cover 90 is secured to the holder 80, the plural pins formed in the holder 80 fit into the plural holes formed in the cover 90, respectively.

The extending portion 93 is formed with lightening grooves 93ah and 93bh extending longitudinally. The biasing members 50a and 50b are inserted into the lightening grooves 93ah and 93bh, respectively. The lightening grooves 93ah and 93bh do not penetrate the extending portion 93 and each have a oblong hole shape with a bottom. The biasing members 50a and 50b are rubbers, but may be sponges that are foamed members. In FIG. 4, the biasing members 50a and 50b are illustrated by hatched lines. As illustrated in FIG. 2, the biasing members 50a and 50b slightly protrude toward the holder 80 from the bottom surface of the cover 90 facing the holder 80.

In the state where the holder 80 is assembled to the cover 90, the biasing members 50a and 50b bias the stators 74a and 74b in the direction Z, respectively. The direction Z is the direction of the perpendicular line of the plane parallel to the board 10, and is perpendicular to the directions X1, X2, and Y. In other words, the direction Z is the direction in which the spindles 87a and 87b rotatably supporting the rotors 72a and 72b, respectively, extend. Also, the biasing members 50a and 50b respectively bias the stators 74a and 74b toward the holder 80. Specifically, the biasing members 50a and 50b abut with and bias the leg portion 74a2 of the stator 74a and the leg portion 74b2 of the stator 74b, respectively. The biasing members 50a and 50b held by the cover 90 are an example of a second biasing member. Herein, the direction in which the biasing member 40 biases the stators 74a and 74b is perpendicular to the direction in which the biasing members 50a and 50b bias the stators 74a and 74b. In other words, the direction in which the first biasing member biases the first and second actuators is perpendicular to the direction in which the second biasing member biases the first and second actuators.

The biasing members 50a and 50b respectively bias the stators 74a and 74b in the state where the holder 80 is assembled with the cover 90, so the stators 74a and 74b are pushed toward the holder 80 and are positionally defined in the direction Z. This defines the positions of the stators 74a and 74b in the direction Z. As mentioned above, the second biasing members function as defining the positions of the stators 74a and 74b in the direction Z.

As mentioned above, the position of the stator 74a are defined in the directions X, Y, and Z by the biasing members 40 and 50a. It is thus possible to suitably suppress the relative positional displacement of the stator 74a to the rotor 72a. This suppresses the variation in characteristics of the magnetic force exerted between the rotor 72a and the stator 74a. It is therefore possible to suppress the variation in rotational characteristics of the rotor 72a. This is applicable to the rotor 72b. This makes it possible to suppress the variation in operating characteristics of the leading blade 20a and the trailing blade 20b.

In the present embodiment, the stator 74a of the actuator 70a includes plural stators that have the same shape and overlap each other in the direction Z in which the spindle 87a extends. This is because, in a case where one plate is processed to make a stator having a required thickness for ensuring desired output, a desired shape accuracy might not be ensured. In the actuator 70a of the blade drive device 1 according to the present embodiment, two pieces included in the stator 74a overlap each other in the direction of the spindle 87a. The stator 74b has the same arrangement. Herein, as mentioned above, the position of the stator 74a is defined in the directions X, Y, and Z by the biasing members 40 and 50a. In this case, since the biasing member 50a causes two pieces of the stator 74a to come into close contact with each other in the direction Z, the biasing member 50a functions as reducing the loss of the magnetic flux passing through the stator 74a and also functions as suppressing a variation in output characteristics of the actuator 70a. The actuator 70b and the stator 74b have the same arrangements. Thus, there can be provided the blade drive device that suppresses the variation in the operating characteristics of the leading blade 20a and the trailing blade 20b, and that suppresses the variation in output characteristics of the actuator, even if the stator includes the plural plates.

Also, in a case where the plural pieces of the stator are used like the actuator in the present embodiment, the plural pieces of the stator might resonate to make a noise. In the present embodiment, the plural pieces of the stator are positionally defined in the directions X, Y, and Z by the biasing members. This can prevent the stator from vibrating, thereby suppressing the resonance noise of the actuator.

Additionally, it can be considered that the position of the stator 74a is defined by bonding the stator 74a to the holder 80. However, in this case, the positional adjustment of the stator 74a and the process of applying the adhesive bond might degrade the assembling workability of the blade drive device 1. Further, the adhesive bond applied to the holder 80 might leak to an undesired area. Also, it can be considered that the stator 74a is secured to the holder 80 by a screw. In this case, an operator has to tighten the screw, so that the assembling workability of the blade drive device 1 might also be degraded. Also, the stator 74a has to be provided with a hole through which the screw penetrates, so that the space cannot be used with efficiency, and dust might be generated. Further, the processing of the stator 74a might be complicated, so that the manufacturing cost of the stator 74a might increase. In the blade drive device 1 according to the present embodiment, such above problems are suppressed by employing the biasing members 40, 50a, and 50b.

The lightening grooves 93ah and 93bh illustrated in FIGS. 2 and 4 are provided for making the thickness of the cover 90 uniform. The cover 90 holds the biasing members 50a and 50b by using the lightening grooves 93ah and 93bh, thereby suppressing an increase in the size of the cover 90.

Additionally, as illustrated in FIGS. 3 and 1, the holder 80 is formed with cutout portions 85ah and 85bh near the magnetic pole portions 74a5 and 74b5, respectively. Thus, the space is defined between the cutout portion 85ah and the magnetic pole portion 74a5. Likewise, the space is defined between the cutout portion 85bh and the magnetic pole portion 74b5. In addition to the biasing member 40, other biasing members may be inserted between the cutout portion 85ah and the magnetic pole portion 74a5 and between the cutout portion 85bh and the magnetic pole portion 74b5, respectively. The stators 74a and 74b are suitably biased in the direction Y by these biasing members. The direction Y is perpendicular to the spindles 87a and 87b and is perpendicular to the directions X1 and X2 in which the biasing member 40 respectively biases the stators 74a and 74b. Specifically, the biasing member inserted into the cutout portion 85ah biases the stator 74a toward the positioning portion 84a3. The biasing member inserted into the cutout portion 85bh biases the stator 74b toward the positioning portion 84b3. The biasing members inserted into the cutout portions 85ah and 85bh and held by the holder 80 are an example of a third biasing member. Here, the directions where the biasing member 40 as the first biasing member biases the stators 74a and 74b, the direction where the biasing members 50a and 50b as the second biasing member bias the stators 74a and 74b, and the direction where the above third biasing members inserted into the cutout portions 85ah and 85bh bias the stators 74a and 74b are perpendicular to one another. It is thus possible to stably define the positions of the stators 74a and 74b.

Also, as illustrated in FIG. 4, the rotor cover portions 95a and 95b are formed with escape portions 96a and 96b for receiving the rotors 72a and 72b, respectively. Further, the rotor cover portions 95a and 95b are formed with lightening grooves 95ah and 95bh, respectively. The lightening grooves 95ah and 95bh do not respectively penetrate through the rotor cover portions 95a and 95b, and each have a hole shape with a bottom. The lightening grooves 95ah and 95bh are respectively formed near the escape portions 96a and 96b. Biasing members may be respectively inserted into the lightening grooves 95ah and 95bh. Therefore, the biasing members, which are inserted into the lightening grooves 95ah and 95bh in the state where the cover 90 is secured to the holder 80, respectively bias the magnetic pole portion 74a5 of the stator 74a and the magnetic pole portion 74b5 of the stator 74b in the direction Z. The above biasing members respectively inserted into the lightening grooves 95ah and 95bh and held by the cover 90 are an example of the second biasing member, and the above biasing members function as defining the positions of the stators 74a and 74b in the direction Z. This can also define the positions of the stators 74a and 74b.

The biasing member inserted into the cutout portion 85ah of the holder 80 and the biasing member inserted into the lightening groove 95ah of the cover 90 abut with the magnetic pole portion 74a5 of the stator 74a. This prevents the magnetic pole portion 74a5 from rattling in the direction Z. Herein, the magnetic pole portion 74a5 faces the rotor 72a rotatably supported. Thus, the vibration caused by the rotation of the rotor 72a tends to be transmitted to the magnetic pole portion 74a5. However, the biasing members respectively inserted into the cutout portion 85ah and the lightening groove 95ah abut with the magnetic pole portion 74a5 to define the position thereof. The magnetic pole portion 74a5 near the rotor 72a is positionally defined in such a manner, thereby effectively suppressing the relative positional displacement of the stator 74a to the rotor 72a. Likewise, biasing members respectively inserted into the cutout portion 85bh of the holder 80 and the lightening groove 95bh of the cover 90 effectively suppress the relative positional displacement of the stator 74b to the rotor 72b. This suppresses the variation in the operating characteristics of the blade driven by the actuators 70a and 70b.

Additionally, a biasing member may be inserted into the lightening groove 95ah, instead of inserting the biasing member 50a into the lightening groove 93ah. A biasing member may be further inserted into the lightening groove 95ah, in addition to inserting the biasing member 50a into the lightening groove 93ah. Likewise, a biasing member may be inserted into the lightening groove 95bh instead of inserting the biasing member 50b into the lightening groove 93bh. A biasing member may be further inserted into the lightening groove 95bh in addition to inserting the biasing member 50b into the lightening groove 93bh.

While the exemplary embodiments of the present invention have been illustrated in detail, the present invention is not limited to the above-mentioned embodiments, and other embodiments, variations and modifications may be made without departing from the scope of the present invention.

In the above present embodiment, the focal plane shutter has been described as one example of the blade drive device. However, the blade drive device may not be the focal plane shutter. Also, a blade is not limited to one linearly moving. A blade may rotate about a predetermined position as a fulcrum. Also, a blade may be a small diaphragm blade which reduces an opening of a board to a desired size. Also, the only single blade may be driven by a single actuator. Also, a blade drive device may be provided with two actuators for driving the only single blade.

In the above embodiment, the biasing members 50a and 50b are provided at the cover 90 side. However, the present invention is not limited to this. Biasing members respectively biasing the stators 74a and 74b toward the cover 90 may be provided at the holder 80 side.

At least one of the biasing members 40, 50a, and 50b may be a spring made of a non-magnetic material. For example, at least one of the biasing members 40, 50a, and 50b may be a coil spring or a leaf spring made of a non-magnetic material.

In the above embodiment, the rotor 72a is separately provided from the spindle 87a rotatably supporting the rotor 72a. That is, the spindle 87a is provided in the holder 80, and does not rotate. However, the present invention is not limited to this. For example, the rotor 72a may be rotatably supported by a rotational shaft integrally provided therewith.

In the above embodiment, the holder 80 supporting the actuators 70a and 70b is separately provided from the board 10. However, the present invention is not limited to this. For example, the board 10 may be provided with support portions for supporting the actuators 70a and 70b, instead of providing the holder 80.

Finally, several aspects of the present invention are summarized as follows.

According to an aspect of the present invention, there is provided a blade drive device including: a board including an opening; a blade movable between a position receding from the opening and a position covering at least a portion of the opening; a first actuator including a first rotor rotatable about a first axis and a first stator, and being capable of driving the blade; a second actuator including a second rotor rotatable about a second axis and a second stator, and being capable of driving the blade; first and second positioning portions respectively positioning the first and second actuators; and a first biasing member respectively biasing the first and second actuators toward the first and second positioning portions.

The first biasing member respectively biases the first and second actuators toward the first and second positioning portions, thereby suppressing an increase in the size and suppressing a variation in operating characteristics of the blade.

According to another aspect of the present invention, there is provided an optical instrument having the above blade drive device.

What is claimed is:

1. A blade drive device, comprising:
a board including an opening;
a blade movable between a position receding from the opening and a position covering at least a portion of the opening;
a first actuator including a first rotor rotatable about a first axis and a first stator, and being capable of driving the blade;
a second actuator including a second rotor rotatable about a second axis and a second stator, and being capable of driving the blade;
first and second positioning portions respectively positioning the first and second actuators; and
a first biasing member respectively biasing the first and second actuators toward the first and second positioning portions,
the first and second positioning portions respectively positioning the first and second stators, and
the first biasing member respectively biasing the first and second stators toward the first and second positioning portions.

2. The blade drive device of claim 1, wherein the first biasing member is arranged between the first and second stators, and biases the first and second stators in opposite directions.

3. The blade drive device of claim 1, wherein
the first and second axes are parallel to each other,
the first and second stators are arranged in a direction perpendicular to the first and second axes, and
the first biasing member biases the first and second stators in the direction perpendicular to the first and second axes.

4. The blade drive device of claim 1, comprising:
a support portion supporting the first and second actuators and provided in the board, and
a second biasing member biasing the first and second actuators toward the support portion in a direction perpendicular to the direction in which the first biasing member biases the first and second actuators.

5. The blade drive device of claim 1, comprising:
a support portion supporting the first and second actuators and provided in the board;
a cover portion secured to the support portion and covering the first and second actuators, and
a second biasing member biasing the first and second actuators toward the cover portion in a direction perpendicular to the direction in which the first biasing member biases the first and second actuators.

6. The blade drive device of claim 1, comprising a third biasing member biasing the first and second actuators in a direction perpendicular to the first and second axes and perpendicular to the direction in which the first biasing member biases the first and second actuators,
wherein the support portion holds the third biasing member.

7. The blade drive device of claim 1, wherein
the blade includes:
first blades including a plurality of blades and driven by the first actuator, and
second blades including a plurality of blades and driven by the second actuator,
the first blades recede from the opening in a state where the first blades overlap each other, and cover the opening in a state where the first blades expand, and
the second blades recede from the opening in a state where the second blades overlap each other, and cover the opening in a state where the second blades expand.

8. The blade drive device of claim 1, wherein the first and second stators each includes a plurality of parts overlapping each other in a direction of the first and second axes.

9. The blade drive device of claim 1, wherein the first biasing member is at least one of a rubber, a foamed member, and a spring member made of a non-magnetic material.

10. The blade drive device of claim 4, comprising
a cover portion secured to the support portion, covering the first and second actuators, and holding the second biasing member.

11. An optical instrument comprising a blade drive device, comprising:
a board including an opening;
a blade movable between a position to recede from the opening and a position to cover at least a portion of the opening;
a first actuator including a first rotor rotatable about a first axis and a first stator, and capable of driving the blade;
a second actuator including a second rotor rotatable about a second axis and a second stator, and capable of driving the blade;
first and second positioning portions respectively positioning the first and second actuators; and
a first biasing member respectively biasing the first and second actuators toward the first and second positioning portions,
the first and second positioning portions respectively positioning the first and second stators, and
the first biasing member respectively biasing the first and second stators toward the first and second positioning portions.

* * * * *